United States Patent
Mears et al.

(10) Patent No.: US 8,739,939 B2
(45) Date of Patent: Jun. 3, 2014

(54) BRAKE SYSTEM AND METHOD

(71) Applicant: Honda Motor Co., Ltd., Tokyo (JP)

(72) Inventors: Joseph Aaron Mears, Columbus, OH (US); Hiroki Ishikawa, Dublin, OH (US); Kevin Scott Katerberg, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/726,268

(22) Filed: Dec. 24, 2012

(65) Prior Publication Data

US 2013/0105257 A1    May 2, 2013

Related U.S. Application Data

(62) Division of application No. 11/530,956, filed on Sep. 12, 2006, now Pat. No. 8,336,679.

(51) Int. Cl.
*F16D 65/14* (2006.01)

(52) U.S. Cl.
USPC ............................. 188/2 D; 296/204; 296/205

(58) Field of Classification Search
USPC ............. 188/2 D; 296/204, 205, 208, 193.07; 74/502.5, 500.5, 501.5 R, 502.4, 502.6
See application file for complete search history.

(56) References Cited

U.S. PATENT DOCUMENTS

| | | | |
|---|---|---|---|
| 2,112,101 A | 3/1938 | Kliesrath | |
| 2,710,222 A | 6/1955 | Barenyi | |
| 3,494,657 A | 2/1970 | Harper et al. | |
| 4,428,613 A | 1/1984 | Nomura | |
| 4,511,176 A | 4/1985 | Watanabe et al. | |
| 4,747,636 A | 5/1988 | Harasaki et al. | |
| 5,484,039 A | 1/1996 | Singleton et al. | |
| 5,876,090 A | 3/1999 | Kawaguti | |
| 6,383,599 B1 | 5/2002 | Bell et al. | |
| 6,537,641 B1 | 3/2003 | Kroll | |

FOREIGN PATENT DOCUMENTS

| | | |
|---|---|---|
| JP | 59212929 A | 12/1984 |
| JP | 2000-62606 A | 2/2000 |

*Primary Examiner* — Robert A Siconolfi
*Assistant Examiner* — Mahbubur Rashid
(74) *Attorney, Agent, or Firm* — Kenealy Vaidya LLP; Mark E. Duell

(57) ABSTRACT

A brake system for a vehicle can include a brake actuator, an equalizer operably connected to the actuator, and two brake wires that are each connected to the equalizer and extend to first and second brake assemblies. The first and second brake wires can extend in a first direction extending from a front of the vehicle toward a rear of the vehicle. The first brake wire can cross over the second brake wire at least once and possibly twice, each time in a direction transverse to the first direction. Additionally, the first and second brake wires can each include a cover that protects a respective wire. The covers can be in contact with each other at the crossover point for the wires to minimize noise, friction and to improve operating ability and durability of the brake wires. The various features, such as the cross-over configuration, the contacting wires, and/or the covers, also make it possible to minimize the space requirements for the wires in the vehicle.

10 Claims, 5 Drawing Sheets

BRAKE SYSTEM AND METHOD

This application claims the priority benefit under 35 U.S.C. §120 and is a Divisional of co-pending U.S. patent application Ser. No. 11/530,956 filed on Sep. 12, 2006, the subject matter of which application is hereby incorporated in its entirety by reference.

BACKGROUND

1. Field

The disclosed subject matter relates to a brake system for vehicles and a method of use thereof. More particularly, the disclosed subject matter relates to arrangements of brake wires and other vehicle components.

2. Description of the Related Art

Vehicles typically include brake systems such as parking brake systems that prevent the vehicle from moving unintentionally when parked and which provide emergency braking, if necessary. The brake system typically includes a wire arrangement with right and left wires that are routed to brake assemblies associated with the right and left rear or front wheels. The wires are typically routed in a manner that avoids sharp bends which can negatively affect performance and/or durability of the wires.

Some conventional parking brake systems include right and left wires that run separately (and sometimes parallel) to one another before turning off toward the respective right and left rear wheel parking brake assemblies. However, packaging space for the parking brake wires is limited by space requirements for other vehicle components, such as, for example, the fuel tank, muffler, and interior passenger space requirements. Therefore, running separate paths for each of the vehicle parking brake wires has a disadvantage in that it consumes a great deal of space in the vehicle.

Some conventional parking brake systems, such as that disclosed in U.S. Pat. No. 4,428,613, include a pair of parallel parking brake wires that cross over each other once before being routed outward toward respective rear wheels. However, U.S. Pat. No. 4,428,613 discloses a mechanism in which parking brake wires are slidably guided by and curved along a supporting bracket to form a large radius of curvature and extend toward respective rear wheel brakes in a crossing manner, but without the wires interfering with each other. Thanks to the large radius of curvature, the wires can operate at high operation efficiency and can have an improved durability to make an efficient transmission of force to the rear wheel brakes. However, the vertical spacing requirements for the supporting bracket structure may be undesirable in light of vertical packaging space limitations, and may result in additional abrasion and performance problems associated with the additional supporting bracket structure located in the vehicle.

It may be desirable to provide parking brake systems that maintain relatively large curvatures of the parking brake wires as they are routed to their respective wheels and/or minimize vertical space requirements. It may also be desirable that such systems minimize performance loss and/or maintain high durability of the wires while minimizing noise during vehicle operation and brake operation.

SUMMARY

According to an aspect of the disclosed subject matter, a parking brake system for a vehicle can include a parking brake actuator, an equalizer operably connected to the actuator, a first parking brake wire having a first end connected to the equalizer and a second end connected to a first rear brake assembly associated with a first rear wheel, and a second parking brake wire having a first end connected to the equalizer and a second end connected to a second rear brake assembly associated with a second rear wheel. The first and second parking brake wires can extend substantially parallel to one another in a first direction extending from a front of the vehicle toward a rear of the vehicle. The first parking brake wire can cross over the second parking brake wire twice in a second direction transverse to the first direction.

In accordance with another aspect of the disclosed subject matter, a parking brake system for a vehicle can include a parking brake actuator, an equalizer operably connected to the actuator, a first parking brake wire having a first end connected to the equalizer and a second end connected to a first rear brake assembly associated with a first rear wheel, and a second parking brake wire having a first end connected to the equalizer and a second end connected to a second rear brake assembly associated with a second rear wheel. The system can include a first cover located adjacent a portion of the first parking brake wire and a second cover located adjacent a portion of the second parking brake wire. The first and second parking brake wires can extend substantially parallel to one another in a first direction extending from a front of the vehicle toward a rear of the vehicle. The portion of the first parking brake wire with the first cover can cross over the portion of the second parking brake wire with the second cover in a second direction at an angle with the first direction. The first and second covers can be in contact with one another.

In accordance with another aspect of the disclosed subject matter, a packaging system for vehicle components can include a chassis floor panel, a heater duct extending from a first side of the chassis floor panel, a cover hingedly coupled to the heater duct, a parking brake actuator, and an equalizer operably connected to the actuator. A first parking brake wire can have a first end connected to the equalizer and a second end connected to a first rear brake assembly associated with a first rear wheel. A second parking brake wire can have a first end connected to the equalizer and a second end connected to a second rear brake assembly associated with a second rear wheel. The first and second parking brake wires can be located between the first side of the floor panel and the cover.

Still other features, characteristics and advantages of the disclosed subject matter will become apparent to those skilled in the art from a reading of the following detailed description of embodiments constructed in accordance therewith, and taken in conjunction with the accompanying drawings.

BRIEF DESCRIPTION OF THE DRAWINGS

The disclosed subject matter of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
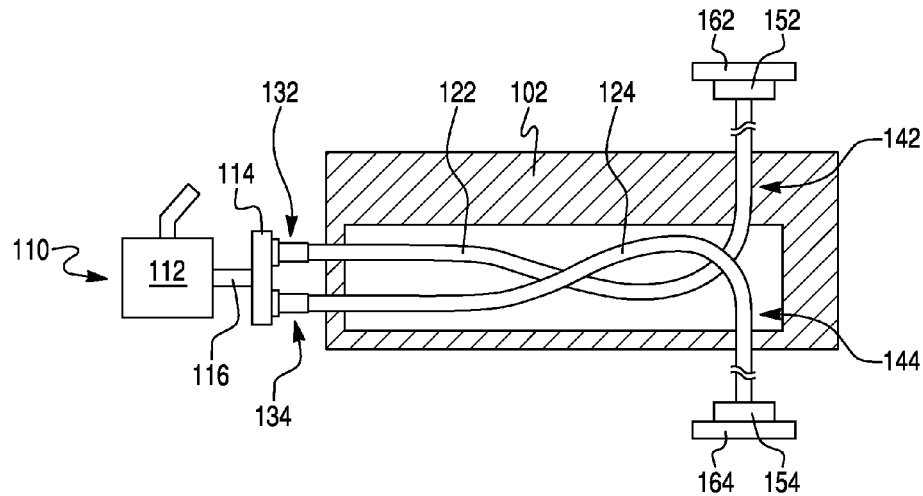
FIG. 1 is a top view of an exemplary embodiment of a brake system made in accordance with principles of the disclosed subject matter.

Referring to the drawing figures, like reference numerals designate identical or corresponding elements throughout the several figures.

FIG. 1 shows a top view of an exemplary embodiment of a brake system 110 made in accordance with principles of the disclosed subject matter. The brake system 110 can include an actuator formed as a manually-operated brake lever 112 disposed at any location in a vehicle that is accessible by an occupant, for example, a driver, of the vehicle, as is well known to those skilled in the art. The brake lever 112 may be structured and arranged to be operated by hand or foot. Alternatively, the brake actuator can be automated such that it can be operated by solenoid, pneumatic devices, or the like that are controlled by a control unit.

The brake system 110 can further include an equalizer 114 that connects the brake lever 112 to two separate wires 122 and 124 and is configured to meter out and balance the force transmitted to each of the wires 122 and 124. The specific structure, function, and operation of the equalizer are known by persons of ordinary skill in the art. The equalizer 114 can be connected, for example, via a wire 116, to an end of the brake lever 112.

A first brake wire 122 can extend rearward from the equalizer 114, and can include a first end 132 connected to the equalizer 114 and a second end 142 connected to a first rear brake assembly 152 associated with a first rear wheel 162. A second brake wire 124 can extend rearward from the equalizer 114 and can include a first end 134 connected to the equalizer 114 and a second end 144 connected to a second rear brake assembly 154 associated with a second rear wheel 164.

As shown in FIG. 1, the first and second brake wires 122, 124 can extend substantially parallel to one another along a portion of their length extending in a first direction from a front of the vehicle toward a rear of the vehicle. According to the embodiment shown in FIG. 1, the first brake wire 122 crosses over the second brake wire 124 at two locations along the length of the first and second brake wires 122, 124. The first and second brake wires 122, 124 may or may not touch each other either of the two times that they cross over each other. The wires 122, 124 can extend along the first direction for a certain distance and then be configured to cross over each other at an oblique angle with respect to the first direction. The wires 122, 124 can then be redirected to cross back over each other again at an oblique angle with respect to each other and/or the first direction and then extend towards respective first and second rear brake assemblies 152, 154.

It should be appreciated that the first rear wheel 162 may be the right rear wheel and the second rear wheel 164 may be the left rear wheel, or the first rear wheel 162 may be the left rear wheel and the second rear wheel 164 may be the right rear wheel. In either case, each brake wire 122, 124 extends from the equalizer 114 on a side of the vehicle corresponding to the respective rear brake assembly 152, 154 and rear wheel 162, 164 to which it is connected. It should further be appreciated that brake wire 124 may cross above or below brake wire 122. The double crossover of the wires 122, 124 enables a large radius of curvature as the wires turn outward from a relative center of the vehicle toward the respective wheel 162, 164 while minimizing packaging space.

The first and second brake wires 122, 124 can be located between heat ducts 102 or other support structures such that the heater ducts and/or other support structures provide guidance to the wires 122, 124.

Figure 2:
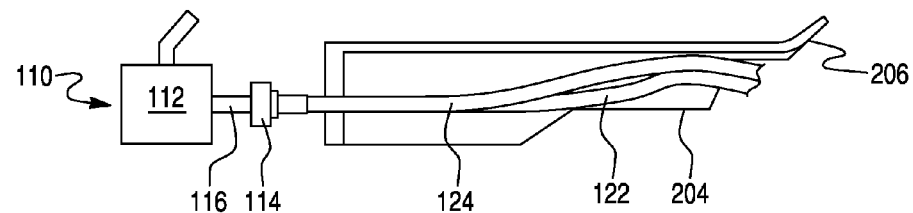
FIG. 2 is a side view of the exemplary brake system of FIG. 1.

Referring now to FIG. 2, the brake wires 122, 124 may be disposed above a first surface of a substantially planar floor panel 204 and below housing cover 206. The housing cover 206 may include, for example, carpet, plastic, metal, or any other material that can cover and/or protect the wires 122, 124.

Figure 3:
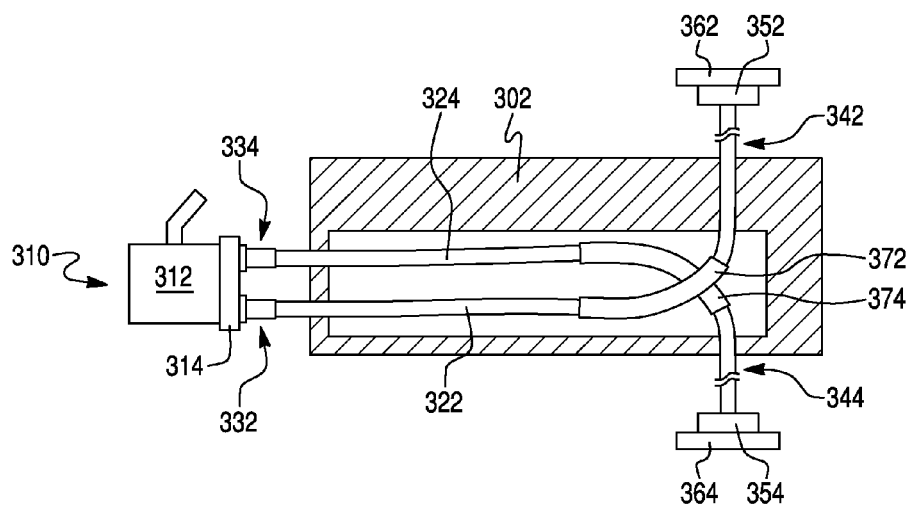
FIG. 3 is a top view of another exemplary embodiment of a brake system made in accordance with principles of the disclosed subject matter.

FIG. 3 shows a top view of another exemplary brake system 310 made in accordance with principles of the disclosed subject matter. The brake system 310 can include an actuator formed as a brake lever 312 disposed at any location in a vehicle. If the brake lever is manually operable, it should be located at a position that is accessible by an occupant of the vehicle, for example, a driver, of the vehicle, as is well known to those skilled in the art. The brake lever 312 may be structured and arranged to be operated by hand or foot. Alternatively, the brake actuator can be automated such that it can be operated by solenoid, pneumatic devices, or the like that are controlled by a control unit.

The brake system 310 can further include an equalizer 314 that is connected, for example, via a wire 316, to an end of the brake lever 312. A first brake wire 322 can extend rearward from the equalizer 314, and can have a first end 332 connected to the equalizer 314 and a second end 342 connected to a first rear brake assembly 352 associated with a first rear wheel 362. The first brake wire 322 can include a cover 372 located over a crossover portion thereof. The cover 372 can be formed as a sleeve, partial covering, coating, etc. The wire 322 and cover 372 may be bonded to one another via an adhesive or coupled via an interference fit such that the cover 372 does not unintentionally move along a length of the wire 322. The cover 372 may be made from various materials, including plastics, rubbers, metals, etc., and in particular, can be made from Ethylene Propylene Diene Monomer (EPDM).

A second brake wire 324 can extend rearward from the equalizer 314 and can have a first end 334 connected to the equalizer 314 and a second end 344 connected to a second rear brake assembly 354 associated with a second rear wheel 364. The second brake wire 324 can include a cover 374 located over a crossover portion thereof. The wire 324 and cover 374 may be bonded to one another via an adhesive or coupled via an interference fit such that the cover 374 does not unintentionally move along a length of the wire 324. The cover 374 for the second wire 324 can be made from the same or similar materials as the cover 372 for the first wire 322.

As shown in FIG. 3, the first and second brake wires 322, 324 can extend substantially parallel to one another along a portion of their length extending in a first direction from a front of the vehicle toward a rear of the vehicle. The first brake wire 322 can cross over the second brake wire 324 at a crossover location along the length of the first and second brake wires 322, 324 corresponding to the covers 372, 374. The covers 372, 374 of the first and second brake wires 322, 324 can be in constant or intermittent contact with each other at a location where they cross over. The covers 372, 374 can be configured as sleeves, guard portions, coatings, or other similar structures.

Figure 4:
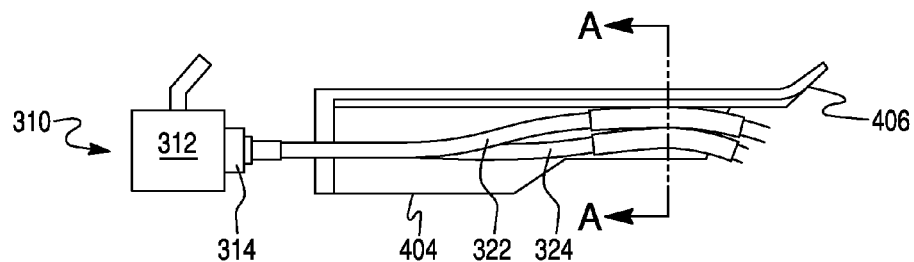
FIG. 4 is a side view of the exemplary brake system of FIG. 3.

The first and second brake wires 322, 324 can be located between heater ducts 302 or other support structures such that the heater ducts and/or other support structures provide guidance to the wires 322, 324. Referring now to FIG. 4, the brake wires 322, 324 can be disposed above a first surface of a substantially planar floor panel 404 and below housing cover 406. The housing cover 406 can contact one of the covers 372, 374 that is furthest from the floor panel 404, for example, at the crossover point for the wires 322, 324. The housing cover 406 can be made from various structures and materials, such as carpet, plastic, metal, or any other structure that can cover and/or protect the wires 322, 324.

It should be appreciated that the first rear wheel 362 may be the right rear wheel and the second rear wheel 364 may be the left rear wheel, or vice versa. In either case, each brake wire 322, 324 extends from the equalizer 314 on a side of the vehicle opposite to the respective rear brake assembly 352, 354 and rear wheel 362, 364 to which it is connected. It should further be appreciated that brake wire 324 may cross above or below brake wire 322. The crossover of the wires 322, 324 enables a large radius of curvature as the wires turn outward from a relative center of the vehicle toward the respective wheel 362, 364 while minimizing packaging space. The contact between the wires 322, 324 and/or between the wire(s) 322, 324 and the housing cover 406 can minimize packaging space in the area above the floor panel 404.

Figure 5:
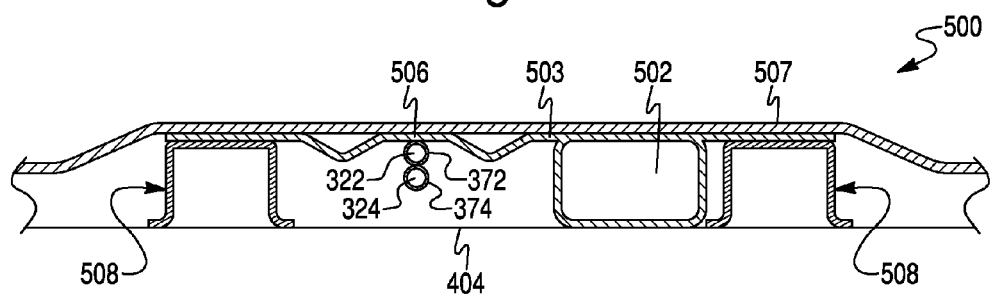
FIG. 5 is a cross-sectional view taken along line A-A of FIG. 4 of an exemplary packaging system for vehicle components.

As shown in the exemplary embodiment of FIG. 5 (section view A-A from FIG. 4), a packaging system 500 for vehicle components can include a housing cover 506 that includes a portion that is hingedly connected to a heater duct 502 at, for example, hinge axis 503. The housing cover 506 can include a molded plastic cover, for example, a plastic molded integrally with the heater duct 502. The heater duct 502 can extend in substantially the same direction as the first and second wires 322, 324, thus providing a substantially parallel support channel along at least a portion of the length of the wires 322, 324. The hinge axis 503 permits an operator to move a door portion of the housing cover 506 away from the floor panel 404 to provide access to the brake wires 322, 324. The housing cover 506 may be supported by one or more structures 508 such as, for example, floor stiffeners. The floor stiffeners may be made from plastic, metal, or another substantially rigid material. The housing cover 506 may be covered by a carpet 507 or other material. In addition, the housing cover 506 can be integrally molded and hinged to the heater duct while being supported by the floor stiffeners.

In the alternative, the brake system could include a self supporting housing cover which does not require supporting structures (e.g., floor stiffeners, ducts, etc.) for guiding the wires and/or providing support. The housing cover can be configured to be bolted or otherwise fastened to the floor or other supporting structures.

As with the embodiment of FIGS. 3 and 4, the first brake wire 322 can cross over, above or below, the second brake wire 324 at a location along the length of the first and second brake wires 322, 324 corresponding to the location of covers 372, 374. The covers 372, 374 of the first and second brake wires 322, 324 can touch each other as they cross in a second direction transverse to the first direction. The first and second brake wires 322, 324 may be located and guided between heater ducts 502 or other structures 508. As shown in FIG. 5, the brake wires 322, 324 can be disposed above a first surface of a substantially planar floor panel 404 and below the housing cover 506. The housing cover 506 can contact at least one of the covers 372, 374 furthest from the floor panel 404 at the crossover location. The contact between the wires 322, 324 and/or between wire(s) 322, 324 and the housing cover 506 can minimize packaging space above the floor panel 404.

In operation, the crossover and double crossover configuration for the brake wires as described above can permit a relatively large curvature of the respective wires. The large curvature can prevent deterioration of operating efficiency and/or lifespan of the brake wires. In addition, the covers provided on the wires can reduce the noise during operation and during travel of the vehicle. The covers can also further protect the wires from abrasion and permit smooth and consistent movement of the wires relative to each other and the housing. The contact between the covers can also prevent or dampen relative movement (and resulting noise) between parts.

Figure 6:
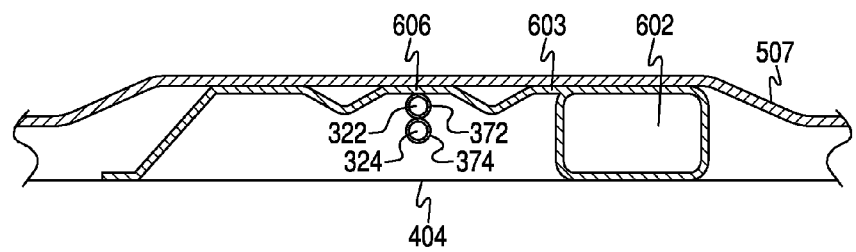
FIG. 6 is a cross-sectional view of another exemplary packaging system for vehicle components including the exemplary brake system of FIG. 3.

FIG. 6 is a cross-sectional view of another exemplary packaging system for the brake wire assembly. The housing cover 606 can include a duct 602 and a hinge 603. A door portion of the housing can be hinged to the duct 602 and enclose wires 322, 324. Covers 372, 374 can be provided on the wires 322, 324, respectively, and the housing cover 606 can be separately formed such that it can be free to contact the floor portion 404 or be bolted, adhered, clipped, or otherwise fastened to the floor 404. A carpet 507 can be laid over the housing cover 606 to finish the flooring portion of the vehicle.

Figure 7:
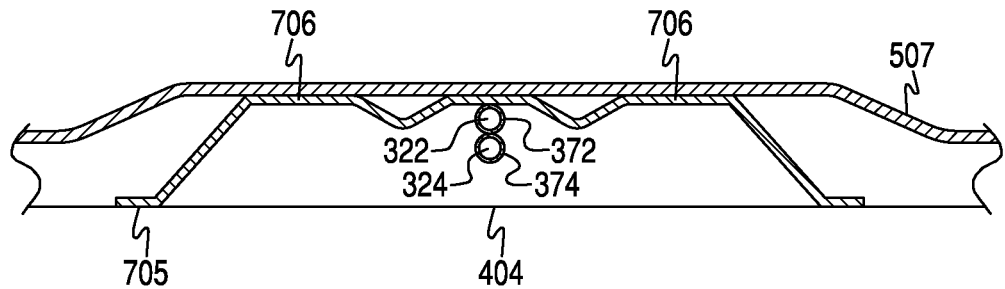
FIG. 7 is a cross-sectional view of yet another exemplary packaging system for vehicle components including the exemplary brake system of FIG. 3

FIG. 7 is a cross-sectional view of another exemplary packaging system for the brake wire assembly. In this example, the housing cover 706 is formed as a channel shaped housing portion that can be left free to contact the floor 404 or can be bolted, clipped, adhered, or otherwise fastened to the floor 404. The housing cover 706 encloses wires 322, 324 which can include covers 372, 374. Again, carpet 507 can be laid over the housing cover 706 to finish the flooring portion of the vehicle. A connection structure 705 can be provided at a portion of the housing cover 706 that is located adjacent the floor 404 for providing a positive connection therebetween. The connection structure 705 can be a bolt, screw, clamp, locking device, rivet, adhesive, weld, other known connector(s), etc.

Figure 8:
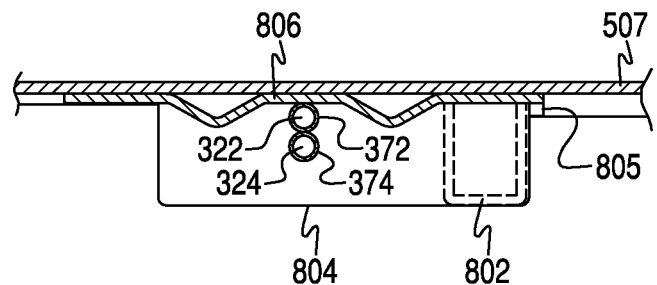
FIG. 8 is a cross-sectional view of still another exemplary packaging system for vehicle components including the exemplary brake system of FIG. 3

FIG. 8 is a cross-sectional view of another exemplary packaging system for the brake wire assembly in which the housing cover 806 is modified for use with a sunken floor portion 804 of a vehicle. In this example, housing cover 806 is designed to span over an opening or channel built into the sunken floor portion 804. A duct 802 can be included in the portion of the housing cover 806 that extends into the sunken floor portion 804, if necessary. The wires 322, 324 crossover and are permitted to touch each other within the sunken floor portion 804 that is enclosed by the housing cover 806. Carpet 507 or other finishing flooring surface can be provided over the housing cover 806. A connection structure 805 can be provided at a portion of the housing cover 806 that is located adjacent the floor 804 for providing a positive connection therebetween. The connection structure 705 can be a bolt, screw, clamp, locking device, rivet, adhesive, weld, other known connector(s), etc.

Figure 9:
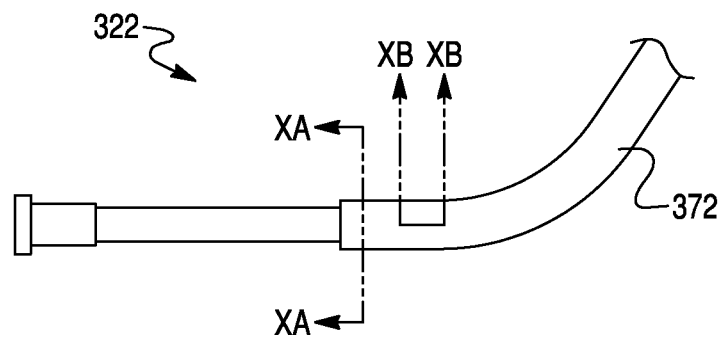
FIG. 9 is a top partial view of an exemplary wire for use with the brake system shown in FIG. 3.
Figure 10A:
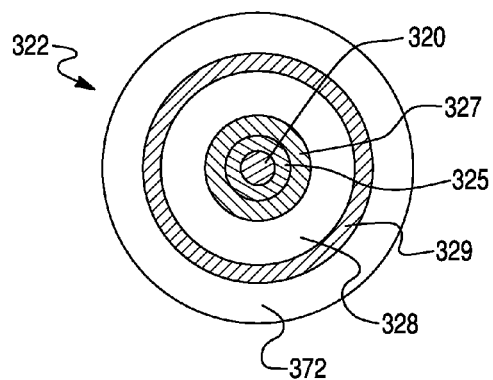
FIG. 10a is a cross-sectional view taken along line XA-XA of FIG. 9.
Figure 10B:
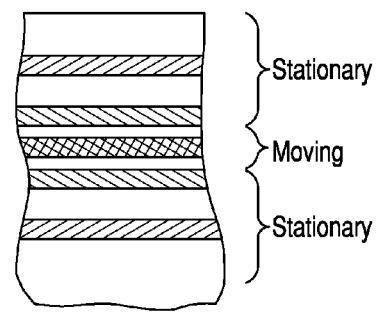
FIG. 10b is a cross-sectional view taken along line XB-XB of FIG. 9.
Figure 11:
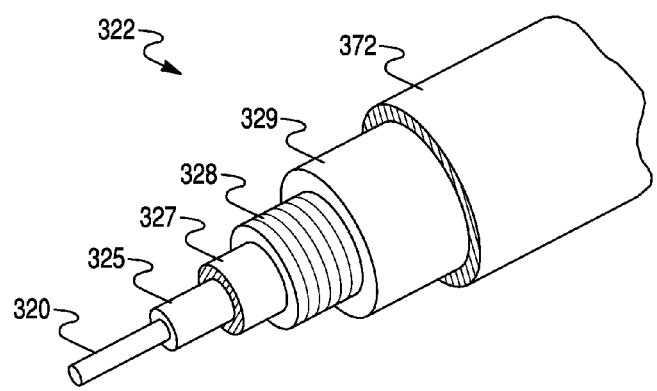
FIG. 11 is a peeled cutaway perspective view of the wire shown in FIG. 9.

FIG. 9 is a top view of an exemplary wire 322 with cover 372. FIGS. 10A and B are cross-sectional views taken along lines XA-XA and XB-XB, respectively, of FIG. 9. FIG. 11 is a peeled cutaway perspective view of the wire shown in FIG. 9. The wire 322 (also known as a wire assembly) can include an inner wire 320 that is sheathed in a nylon coating 325 that is bonded to the inner wire 320. The inner wire 320 can be formed from a multi-strand steel cable, or from other suitable wire materials/structures. A liner 327, if desired, can be sheathed over the nylon coating 325 such that the liner 327 is moveable with respect to the nylon coating 325. A steel coil 328 can be placed over the liner 327. An outer casing 329, such as an overmolded casing, can be molded over the steel coil 328. Cover 372 is then placed adjacent the outer casing 329.

The inner wire 320 and nylon coating 325 can be configured such that they slide within an outer envelope that includes the liner 327, steel coil 328, outer casing 329, and cover 372. Thus, the inner wire 320 is ultimately attached to and transmits the force between the actuator and the brake assembly.

Figure 12:
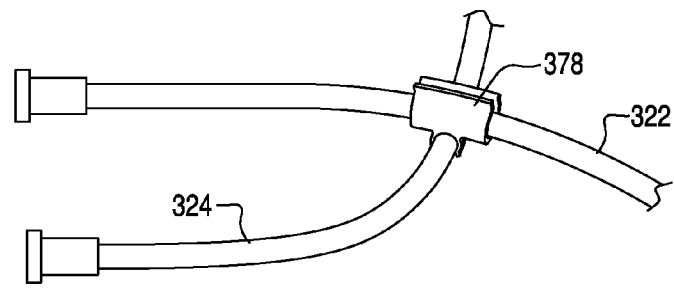
FIG. 12 is a perspective view of another exemplary cover for use in a brake system made in accordance with principles of the disclosed subject matter.

FIG. 12 is a perspective view of another exemplary embodiment of the wire 322 and cover 378. In this example, the cover 378 integrates a cover for the first wire 322 and cover for the second wire 324 into one cover 378. The cover 378 can be a one piece integral structure that includes two semi-tubular portions that cover a portion of and protect each of the respective wires. The cover 378 can be substantially cross shaped and can have a slit running along each of the semi-tubular portions such that each wire can be snapped into and locked in positional relationship with each other by the cover 378. It is also contemplated that the cover 378 be formed from more than one structure and then attached or joined together at the crossing point.

Figure 13:
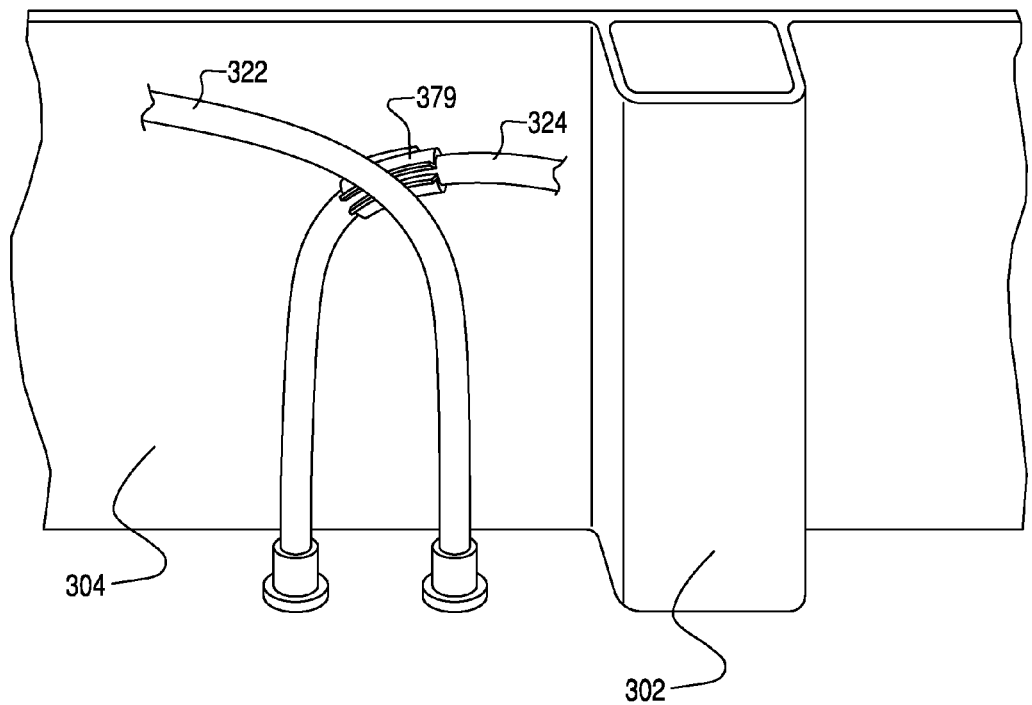
FIG. 13 is a bottom perspective view of yet another exemplary cover for use in a brake system made in accordance with principles of the disclosed subject matter.

FIG. 13 is a bottom perspective view of another cover 379 and its relationship to wires 322 and 324 and housing 304. In this example, cover 379 can be attached to the housing cover 304 at a location at which the wires 322 and 324 cross over. Thus, the cover 379 protects the wires 322 and 324 from wear and tear, noise, and other associated problems. The cover 379 can be molded directly into the housing or can be attached to the housing various known attachment structures. In addition, the cover 379 can be formed as a clip that allows one of the wires 322 or 324 to be snapped into the cover 379 during assembly. Alternatively, the cover 379 can include a separate cover portion for each of the wires 322 and 324, and either one or both of the cover portions can be formed in or attached to the housing cover 304.

While the disclosed subject matter has been described in detail with reference to exemplary embodiments thereof, it is contemplated that various other structures, materials and methods can be employed without departing from the spirit and scope of the disclosed subject matter. For example, while the wires 322, 324 are disclosed as having only portions that include covers 372, 374, the wires could be entirely sheathed with covers 372, 374, or could include other portions that include covers 372, 374 to prevent abrasion and noise. In addition, wires 322, 324, and/or 122, 124 can be made from single strand wires or multi strand and bound wire/cables. The wires can be made from metal, plastic or even fabric strands.

With regard to the covers, it should be noted that covers are also known as protectors in the field of brake systems. The wires 122, 124 in the double crossover configuration as shown in FIG. 1 can include covers similar to covers 372, 374 as described above. In addition, the wires in the single crossover configuration shown in FIG. 3 do not necessarily require the covers 372, 374 for operation. The covers can be slid onto the wires and be slidable relative to the wires, or they can be secured to the wires after being slid on. Alternatively, the covers can be coated onto the wires, bonded to the wires via an adhesive, fixed to the wires via an external clamp, or interference fit onto the wires. The covers can also be integrated into the various structures that house the brake system, such as in the floor structure, the housing cover, the heater ducts, the floor stiffeners, etc.

The equalizer 114, 314 can be any type of mechanism that metes out and distributes the tension from an actuator, such as a brake lever 112, 312, to the brake wires 122, 124 or 322, 324. The equalizer need not be a separate component, but can be incorporated and integrated into the brake actuator itself, as shown in FIGS. 3 and 4. In this case, a wire 316 is not required for connection between the actuator and the equalizer since the equalizer is an integral component of the actuator. In addition, although the brake wires are shown going to the rear brake assemblies of a vehicle, the brake wires can be directed to the front brake assemblies of a vehicle, to combinations of front and rear brake assemblies, and possibly to all brake assemblies of a vehicle.

Although the wires 122, 124 and 322, 324 are shown as being located between heater ducts 102, 302, 502, or between heater ducts and other guiding structures 508, it is contemplated that the wires extend along any structure that bounds them along their extending direction, such as floor stiffeners, body panels, frame members, etc. Of course, it is possible that the wires are not bound on either side by any guiding structure, if desired. In addition, the wires are described above as extending along a substantial or relative center portion of the vehicle. However, it is contemplated that the wires can extend along a right or left side portion of the vehicle and remain within the spirit and scope of the disclosed subject matter. The relative bend in the wire and crossover angles can be changed to allow the wires to run off of the center line of the vehicle. Similarly, the relative angle between the first and second wires with respect to the longitudinal axis of the vehicle need not be the same at the crossover location of the wires.

The brake lever 112, 312 can be manually or automatically operated. For example, the brake lever can be configured as a typical foot pedal actuation mechanism or as a typical pull bar mechanism. However, it could also be configured as an automated electronically or pneumatically controlled device. The wire 116, 316 that extends from the brake lever 112, 312 can be configured as a single strand wire, a multiple strand braided wire, covered wire, etc., and can be made from various materials, including metals, plastics, and even fabrics.

The housing cover 206, 304, 406, 506, 606, 706, 806 can be formed as a hinged door mechanism to provide access to the brake wires. However, it is contemplated that the housing cover be configured as a slide door; punch out door; a separate piece that is attached to the housing body via screws, rivets, or the other attachment means; or the like.

In addition, the cover can be configured such that it does not rest upon any support structure (such as support structure 508, or other floor stiffener) and simply rests upon the floor panel of the vehicle. The cover can also be provided with tabs that extend from the cover and rest upon a floor support structure to provide added rigidity or stability to the cover. It is also contemplated that the cover be formed as a hollow structure to provide additional rigidity and strength to the cover. Of course, the hollow portion of the cover could be adapted for use in various ways, such as for use as a heater duct, an electrical conduit, storage space, etc.

While the disclosed subject matter has been described in detail with reference to exemplary embodiments thereof, it will be apparent to one skilled in the art that various changes can be made, and equivalents employed, without departing from the scope of the disclosed subject matter. Other embodiments of the invention will be apparent to those skilled in the art from consideration of the specification and practice of the disclosed subject matter. It is intended that the specification and examples be considered as exemplary only.

What is claimed is:

1. A brake system for a vehicle, comprising:
    a brake actuator;
    an equalizer operably connected to the brake actuator;
    a first brake wire having a first portion connected to the equalizer and a second portion connected to a first brake assembly associated with a first wheel; and
    a second brake wire having a first portion connected to the equalizer and a second portion connected to a second brake assembly associated with a second wheel, wherein the first and second brake wires extend from the equalizer toward a portion of the vehicle located substantially between the first wheel and second wheel, the first brake wire crossing the second brake wire at two locations spaced from the equalizer such that the first brake wire and second brake wire extend from the equalizer to the first brake assembly and second brake assembly, respectively.

2. The brake system of claim 1, wherein the brake system is a parking brake system, and the first wheel and second wheel are rear wheels of the vehicle.

3. The brake system of claim 1, further comprising:
    a first cover located adjacent a portion of the first brake wire; and
    a second cover located adjacent a portion of the second brake wire, wherein the first cover and second cover are located at one of the two locations at which the first brake wire crosses the second brake wire, the first cover and second cover being in contact with each other.

4. The brake system of claim 3, wherein the first cover and second cover are connected to the first brake wire and second brake wire, respectively, via at least one of an adhesive bond and an interference fit.

5. The brake system of claim 1, wherein the equalizer is incorporated into the actuator.

6. The brake system of claim 3, wherein at least one of the first cover and second cover comprises a rubber material.

7. The brake system of claim 3, wherein at least one of the first cover and second cover comprises Ethylene Propylene Diene Monomer.

8. The brake system of claim 1, wherein the equalizer is separated from and connected to the brake actuator via a wire.

9. The brake system of claim 1, further comprising:
    a housing cover located adjacent the first brake wire and the second brake wire and configured to protect the first brake wire and second brake wire, wherein at least one of the first cover and the second cover contacts the housing cover.

10. The brake system of claim 1, further comprising:
    a housing cover including a central portion and two support portions, the central portion extending from one of the support portions to another one of the support portions, and wherein
    the central portion of the housing cover is located adjacent the first brake wire and the second brake wire, at least one of the first cover and the second cover contacts the central portion of the housing cover, and the support portions are configured to engage a floor panel of a vehicle and suspend the central portion above the floor panel such that the housing cover protects the first brake wire and second brake wire when the housing cover is secured to the floor panel.

* * * * *